Dec. 16, 1952    G. ERISMANN    2,621,469
SHOCK-ABSORBING BEARING IN TIMEKEEPERS
Filed Dec. 19, 1947
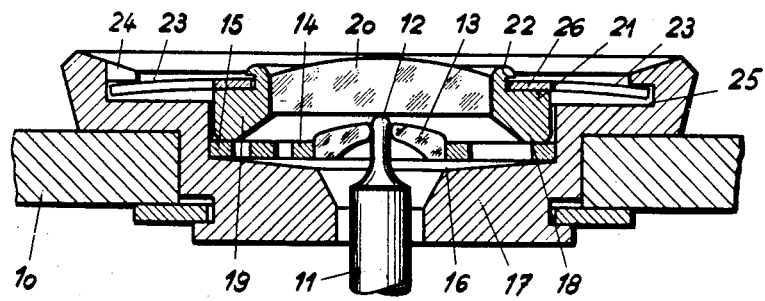
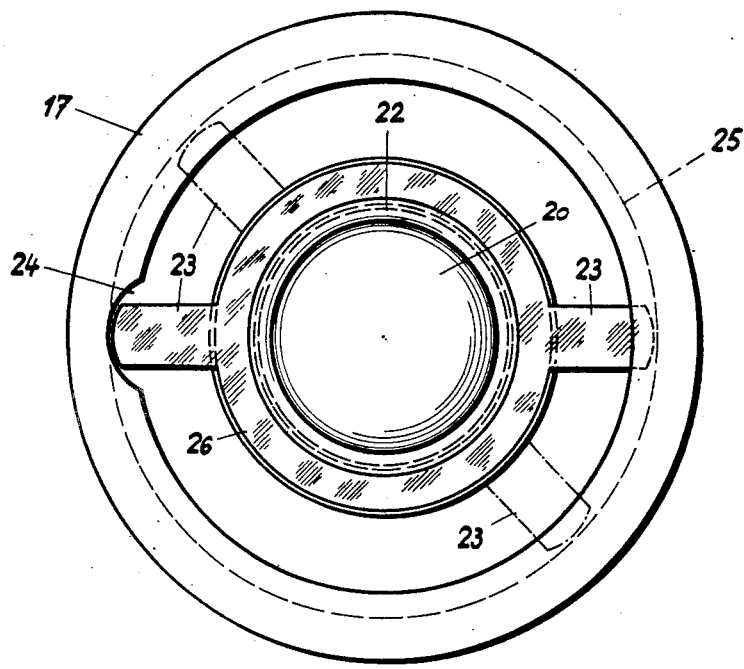
INVENTOR
GÉRARD ERISMANN
By Young, Emery & Thompson
Att'ys.

Patented Dec. 16, 1952

2,621,469

UNITED STATES PATENT OFFICE 2,621,469

SHOCK-ABSORBING BEARING IN TIMEKEEPERS

Gérard Erismann, Neuveville, Switzerland, assignor to Erismann-Schinz S. A., Neuveville, Switzerland Application December 19, 1947, Serial No. 792,710
In Switzerland December 24, 1946

2 Claims. (Cl. 58—140)

This invention relates to shock-absorbing bearings for movable parts (such as the balance staff, etc.) in time keepers of different kinds. In most of these bearings, known up to date, a spring pressing upon the cap jewel recenters the different bearing parts displaced by a shock. In former structures this spring was fixed to the cock carrying the bearing and was very long. In the long run of the development of shock-absorbing bearings a reduction in length of this spring became necessary for several reasons. Finally the springs fixed to the cocks were replaced by springs directly held by parts of the bearings themselves. However, these latter springs were very small and had no positive connection with any part of the bearing, so that, on dissassembling the bearing, for instance for changing the lubricant, the springs run the risk of being lost.

The invention remedies these inconveniences in that the spring holding the cap jewel is fixed to the cap-jewel setting.

Other objects and features will be apparent as the following description proceeds, reference being had to the accompanying drawings, wherein:

Fig. 1 is a section through the axis of the movable part to be protected, and

Fig. 2 is a plan view of the bearing.

The type of shock-absorbing bearings shown in the drawing has a pierced jewel set in an elastic means held in the bearing body, but the invention may as well be used in other usual systems comprising cones fitted into one another and recentered after each shock by means of a spring.

Referring now to Figs. 1 and 2, 10 designates the cock of a balance the shaft 11 of which has a pivot 12 entering the pierced jewel 13. This latter is set in an elastic means 14 the outer rim 15 of which is clamped fast on the bottom of a recess 16 of the bearing body 17 by the lower face 18 of the setting 19 of the cap jewel 20.

The setting 19 has a flat portion 21 bordered at the inside by a collar 22 with its free end slightly bulged outwards to form a flange. Between this flange and the flat portion 21 a spring 26 is held with play. It is thus unseparably coupled with the setting 19. "Unseparably" means that, on the bearing being taken to pieces, the spring 26 and the setting 19 remain together, unless they are forcibly separated from each other. This spring is in the form of an elastic ring with two diametrically arranged elastic tongues 23 projecting outwards. The free ends of the tongues 23 can be inserted through a cut-out 24 into an annular groove 25 of the bearing body 17. As may be seen in Fig. 1, the height of the setting 19 is sufficient to allow the spring 26 of being tightened when the tongues 23 are inserted into the groove 25. The collar 22 does not clamp the ring of the spring 26. The play allows this ring to cooperate with the flat portion 21 over the whole circumference halves lying between the tongues in order not only to hold the cap jewel in place but also the elastic means 14 in which the pierced jewel 13 is set.

On disassembling the bearing, it suffices to displace the tongues (shown in Fig. 2 in chain-dotted lines in their working position) by means of a pointed instrument until one of the tongues is in reach of the cut-out 24, as shown in full lines in Fig. 2. By seizing this tongue, e. g. by means of a pincette, the cap jewel, the setting of which is fixed to the spring 26, can be removed without any danger of losing the spring or another part.

The positive coupling together of the cap jewel and the spring reduces the number of independent parts of the shock-absorbing bearing to a minimum never reached up till now.

What I claim is:

1. In a shock-absorbing bearing for timepieces, a bearing body having a groove and a recess, an elastic means supported on the bottom of said recess, a pierced jewel set in said elastic means, a cap jewel setting supported on said elastic means and clamping the latter fast on the bottom of said recess, a cap jewel fixed to said cap jewel setting, and a spring unseparably coupled with said cap jewel setting and supported on a wall of said groove to be tightened and to act upon said cap jewel setting in axial direction of the bearing.

2. In a shock-absorbing bearing for timepieces, a bearing body having a groove and a recess, an elastic means supported on the bottom of said recess, a pierced jewel set in said elastic means, a cap jewel setting supported on said elastic means comprising a flange and a flat portion opposite to said flange, a cap jewel fixed to said cap jewel setting, and a spring unseparably coupled with said cap jewel setting and comprising, a ring between said flange and said flat portion, contacting said flat portion and having play with regard to said flange, and diametrically disposed extensions fixed to said ring and supported on a wall of said groove to be tightened and to press said cap jewel setting onto said elastic means to clamp the latter fast on the bottom of said recess.

GÉRARD ERISMANN.

REFERENCES CITED

The following references are of record in the file of this patent:

UNITED STATES PATENTS

| Number | Name | Date |
|---|---|---|
| 1,310,038 | Stewart | July 15, 1919 |
| 1,418,427 | Brun | June 6, 1922 |
| 1,469,079 | Glenn | Sept. 25, 1923 |
| 1,707,542 | Sigler | Apr. 2, 1929 |
| 2,282,122 | Erismann | May 5, 1942 |
| 2,294,023 | Colomb | Aug. 25, 1942 |

FOREIGN PATENTS

| Number | Country | Date |
|---|---|---|
| 175,721 | Switzerland | May 16, 1935 |
| 199,529 | Switzerland | Nov. 16, 1938 |
| 240,491 | Switzerland | Apr. 16, 1946 |
| 240,840 | Switzerland | June 1, 1946 |